UNITED STATES PATENT OFFICE.

GUSTAVE O. ZELLER, OF RAHWAY, NEW JERSEY.

PROCESS OF MANUFACTURING SOLVENTS OF PYROXYLIN AND THEIR PRODUCTS.

SPECIFICATION forming part of Letters Patent No. 518,388, dated April 17, 1894.

Application filed December 12, 1893. Serial No. 493,617. (No specimens.)

*To all whom it may concern:*

Be it known that I, GUSTAVE O. ZELLER, a citizen of the United States, residing at Rahway, in the county of Union, State of New Jersey, have invented certain new and useful Improvements in Processes of Manufacturing Solvents of Pyroxylin and their Products; and I do hereby declare that the following is a full, exact, and clear description of the invention, which will enable others skilled in the art to which it appertains to use the same.

My invention has for its object the preparation of thin solutions of pyroxyline with solvents that are improvements upon and distinct additive modifications of compounds, prepared (as described in an application for Letters Patent filed December 12, 1893, and serially numbered 493,615) by the action of an oxidizing agent on an alcohol, producing an aldehyde, and with an organic acid also produced by the action of the oxidizing agent or otherwise caused to be present or added. These compounds are like in their nature to esters of the alcohols as combined with an organic acid, and differ in that they have origin in aldehydic radicles united to acid radicles. In further pursuance of my researches in this subject, I have found that similarly to an organic acid producing mixed esters with mixed alcohols, the hydrogen of the carboxyles can be substituted by two or more aldehydic radicles.

This further invention is described and claimed in an application for Letters Patent, filed December 12, 1893, and numbered 493,616.

In still further research into the combinations brought about by the action of oxidizing agents on mixtures of alcoholic and other organic radicles, I have produced a mixed-oxidation-product-benzine solvent of pyroxyline, which has properties superior to those of a mere mixture of mixed-oxidation-products and benzine, as will be understood by those skilled in the art. Oxidizing agents acting upon the hydrocarbons that constitute benzine transform them into oxidized products, and when this oxidation occurs under the conditions under which the described mixed oxidation products are formed, corresponding compounds are similarly formed, differing however in chemical composition. Hence when a mixture of one, two, or more alcohols and benzine, in the presence of one or more compounding acids, is subjected to treatment with an oxidizing agent, and the oxidized products are separated by distillation and refined, a compound is produced which is not a mixture of benzine with the described oxidation products but which is a benzine compound. I find such compounds are excellent solvents, and diluents of solvents, and of solutions of pyroxyline.

To illustrate one of the numerous ways of carrying out my invention, I give the following detail: I take butylic alcohol, one part, by weight; amylic alcohol, five parts; benzine, two parts; acetic acid, one part; formic acid, one part; and distill this mixture with the following: sulphuric acid, two parts; peroxide of manganese, one part; and I collect the distillate and wash and refine the same in any usual manner of such procedure. I find that I can substitute for the benzine other substances, such as kerosene, benzene (or benzole,) spirits of turpentine, oil of mirbane, and other hydrocarbons.

Having described my invention, what I claim, and desire to secure by Letters Patent, is—

1. The process of manufacturing solvents of pyroxyline which consists in mixing one or more alcohols with benzine and submitting the mixture to distillation with an oxidizing agent.

2. The process of manufacturing solvents of pyroxyline which consists in mixing one or more alcohols with benzine and compounding organic acids, submitting the mixture to distillation with an oxidizing agent; and washing and refining the distillate.

3. A pyroxyline compound which is the product of solution of pyroxyline in the described oxidation-product-benzine compound.

GUSTAVE O. ZELLER.

Witnesses:
R. DOLMETSCH,
C. L. BORGMEYER.